Oct. 13, 1936.  H. D. CORWIN  2,057,011
RAPID CUT-OFF MACHINE
Filed July 30, 1932  4 Sheets-Sheet 1

Inventor
HOWARD D. CORWIN
by *Townsend & Beaman*
Attorney

Oct. 13, 1936.  H. D. CORWIN  2,057,011
RAPID CUT-OFF MACHINE
Filed July 30, 1932  4 Sheets-Sheet 2

Inventor
HOWARD D. CORWIN
by Townsend F Beaman
Attorney

Oct. 13, 1936.   H. D. CORWIN   2,057,011
RAPID CUT-OFF MACHINE
Filed July 30, 1932   4 Sheets-Sheet 4
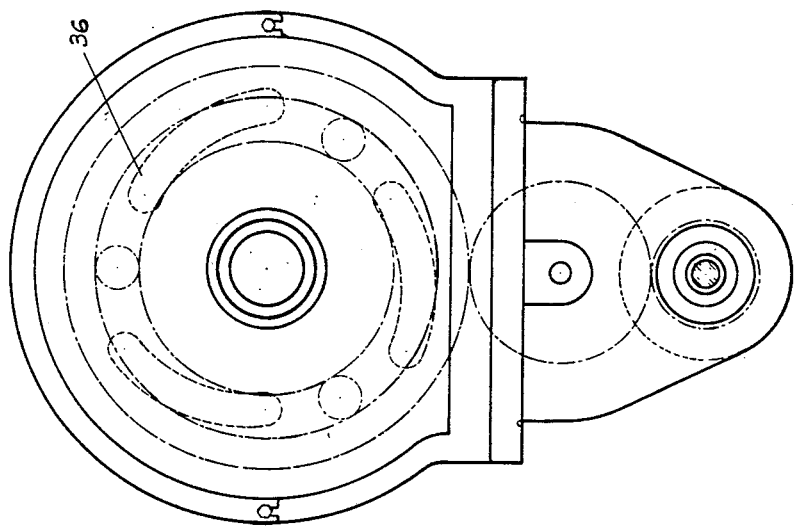
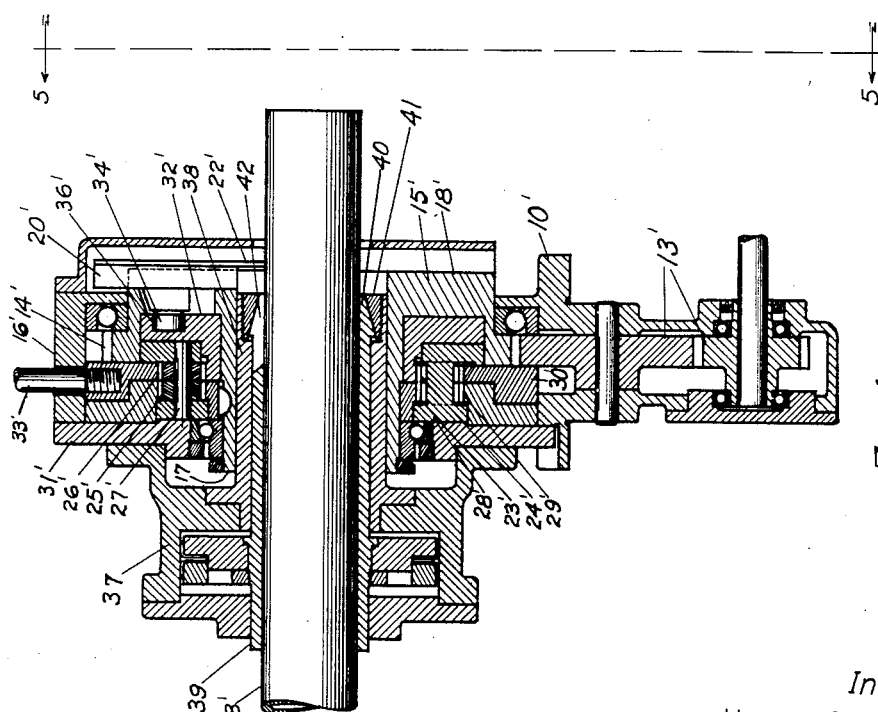
Inventor
HOWARD D. CORWIN
by Townsend F. Beaman
Attorney

UNITED STATES PATENT OFFICE 2,057,011

RAPID CUT-OFF MACHINE

Howard D. Corwin, Jackson, Mich., assignor, by mesne assignments, to American Electric Fusion Corporation, Chicago, Ill., a corporation of Illinois Application July 30, 1932, Serial No. 626,888

10 Claims. (Cl. 81—190)

This invention relates to improvements in the method of cutting relatively long lengths of pipe or tubing into shorter lengths at a high rate of production.

The manufacture of bearings, bushings, and similar hollow or tubular parts frequently involves the operation of cutting long, standard lengths of hollow material into shorter lengths of a size suitable for fabrication of the desired parts. At the present time, the most common method of performing this operation involves the use of special lathes with hollow headstocks of large internal diameter. One end of the tube is gripped in a chuck, and the tube rotated, while a parting tool is fed radially into the work, thus severing a piece of the desired length from the main body of the tube. Such tubes are long, and cannot be rotated rapidly because of "whip" or vibration. Production is further impeded by the necessity of halting rotation of the chuck to release the same before the tube can be advanced to a new cutting position, and by the fact that it is possible to use only one or two parting tools simultaneously on a cut. For such reasons as these, present methods of production are slow, cumbersome, and inefficient. Thus it becomes the primary object of the present invention to provide novel means for doing this type of work more rapidly and efficiently.

More specifically stated, one of the objects of the invention is to eliminate the necessity of rotating the work, by providing means for rotating the parting tool about the work, thus permitting the use of higher cutting speeds than are obtainable when the work is rotated.

Another object of this invention is to provide means for employing a plurality of cutter blades simultaneously on the same cut, thereby dividing the duty between the various blades. This not only reduces wear on the blades and permits longer periods of operation without resharpening, but also permits the use of faster feeds without increasing the thickness of chip removed by any individual blade.

A further object of this invention is to provide independently operated means whereby the stock is clamped rigidly, and so as to reduce to a minimum the vibration and "chatter" commonly associated with the operation of parting tools.

A still further object of this invention is to provide a means for automatically advancing the stock into successive positions whenever it is released from the grip of the clamping mechanism, and for controlling said positions so that successive severed portions of stock will all be of substantially uniform, predetermined length.

Other objects and advantages of my invention will appear as the description of the invention proceeds. It is to be clearly understood, however, that I do not intend to limit myself to the exact details shown or described, but that I intend to include, as part of my invention, all such changes and modifications of parts as would occur to those skilled in this art and would fall within the scope of the claims.

In the drawings wherein several possible embodiments are set forth,

Fig. 4 is a cross sectional view showing an optional construction wherein the clamping mechanism is more closely incorporated with the cut-off mechanism than in the preceding figures.

Fig. 5 is a front elevation, taken on line 5—5 of Fig. 4.

Figure 1:
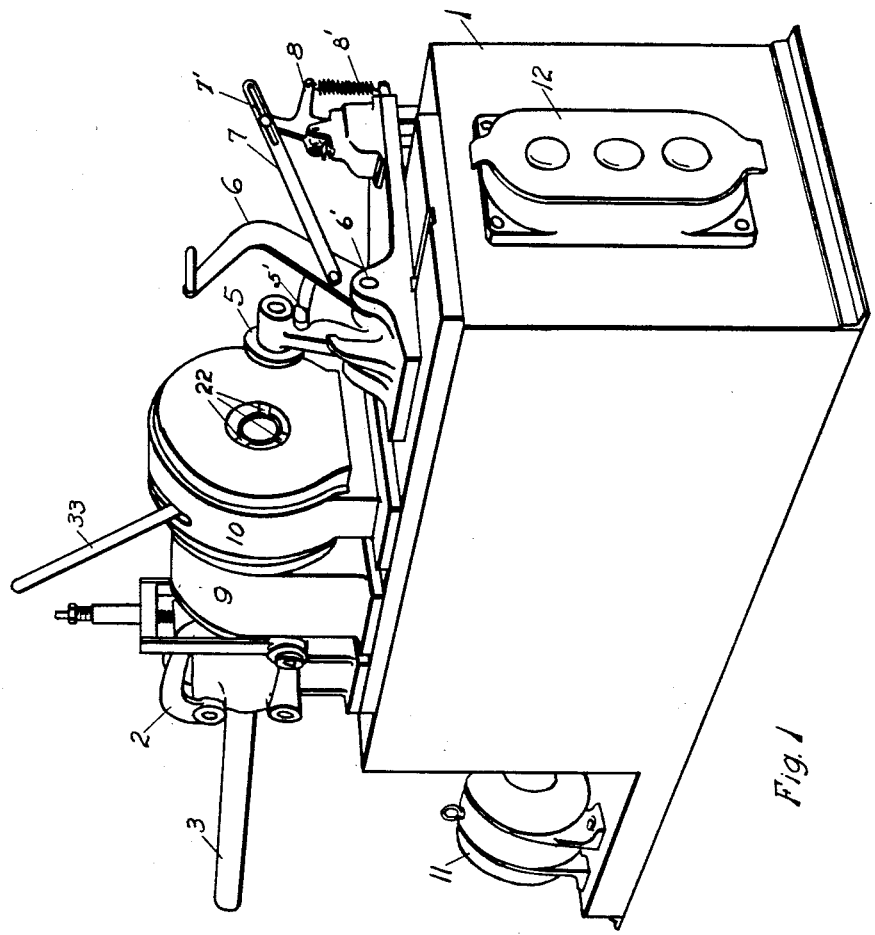
Fig. 1 is a perspective view of a complete machine wherein are combined most of the elements hereinafter described.

In the particular embodiment disclosed in Figs. 1 and 2, the machine is as follows: It consists, broadly, of a means of feeding a relatively long piece of pipe or tubing into position, clamping the tubing firmly against motion in any direction, and cutting off a relatively short piece of predetermined length by means of one or more knives or parting tools which rotate about the axis of the tubing while also feeding into said tubing or work in a substantially radial direction. The machine, when in action, will repeat the above cycle of operation (feeding into position, clamping, and cutting off) until the work has been entirely cut up into short pieces of substantially uniform, predetermined length.

Detailed reference will now be made to the drawings in order that the construction of my improved cut-off machine may be clearly understood by those skilled in the art: A base 1 has mounted thereon a roll feed mechanism 2 driven through a friction drive tending at all times to force the work 3 in the direction of the arrow 4. Motion in this direction is arrested by the adjustable positive stop 5 which is loosely pivoted on a rod 6'. Lugs 5'—5" are provided upon the stop 5 and are located in the path of the operating lever 6 which may also be loosely pivoted on the rod 6'. The spacing of the lugs 5'—5" is such as to provide lost motion with reference to the travel of the lever 6. When the lever is moved rearwardly the lug 5" is engaged by the lever 6 and the stop 5 is rocked out of position. Likewise, when the lever 6 is brought forwardly, the lug 5' is engaged and the stop 5 is rocked into position; the tendency for the overbalanced lever 6 to continue forward will hold the stop 5 in position. A link 7 is positively connected to a valve 8 inserted in conduit connections (not shown) leading to the work holder 9 through a lost motion pin and slot connection 7'. A spring 8' normally holds the valve 8 open to permit the operating fluid to close the jaws of the work holder 9 in a well known manner. As is shown in Fig. 1, when the lever 6 is moved forward to engage the lug 5', and rock the stop 5 into position, the pin will slide in the slot 7' until the end is reached and the valve 8 will be closed to release the work holder and permit the feed roll to advance the work against the stop. No specific novelty resides in the feed roll 2 or work holder 9 as they are both well known in the trade. These elements are claimed, however, in a novel combination embracing the cut-off mechanism generally designated as 10 which is the heart of the machine.

The rotating parts of the cut-off mechanism are driven by a prime mover 11, through a speed change gear box 12, and gear train 13, the final member of which meshes with gear teeth 14 cut on the periphery of the cutter head 15. This cutter head is a flanged tubular piece rotatably mounted within an annular housing 16, and embodying a hollow stem portion 17 concentric with the axis of the work and with the axis of rotation of the cutter head.

Figure 3:
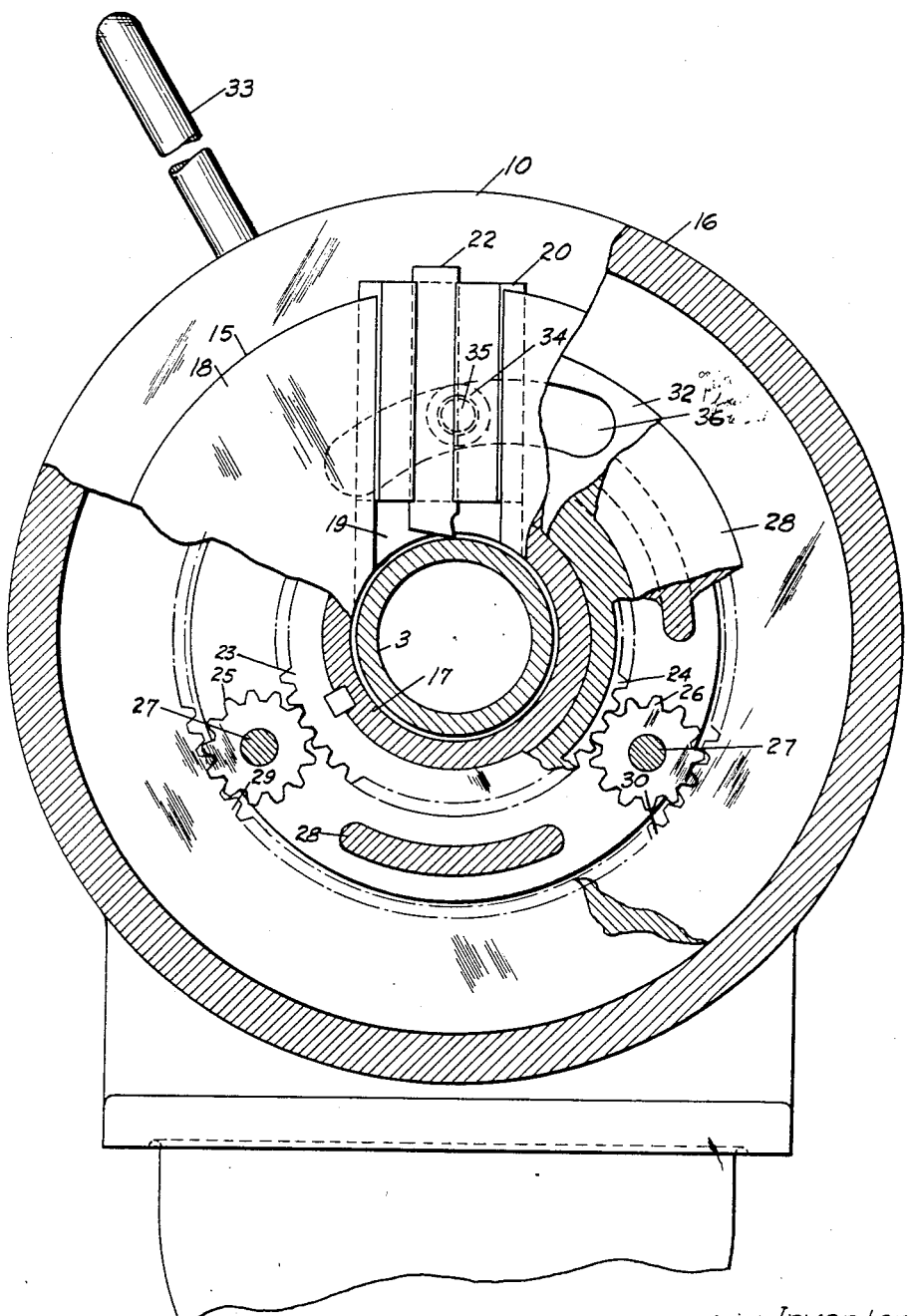
Fig. 3 is a front elevation taken on line 3—3 of Fig. 2, and broken at successively, receding points to show the working parts in proper spacial relationship.

The outer face 18 of the cutter head is in a plane perpendicular to the axis of rotation, and is slotted, as at 19, Fig. 3, to receive one or more tool slides 20 which are thereby restrained to motion relative to the cutter head in a direction substantially radial to the axis of rotation thereof. Tool holders 21 are mounted upon the tool slides, and adapted to adjustably secure the parting tools 22 against any motion relative to the tool slides.

A pinion 23 is keyed to the hollow stem portion 17 of the cutter head, and a corresponding pinion 24 is rotatably mounted upon said hollow stem. One or more planet gears 25 are in mesh with pinion 23, and one or more corresponding planet gears 26 are in mesh with pinion 24. The planet gears are rotatably supported upon shafts 27, the ends of which are secured in a cage 28. The planet gears 25 and 26 are free to rotate independently of one another about their common axis, but are restrained by shafts 27 from any other motion relative to each other. The planet gears 25 are also in mesh with an internal gear 29 which may be integral with the cover 31, or otherwise fixed in position relative to the housing 16. Planet gears 26 are in mesh with an internal gear 30 corresponding to 29, but rotatably mounted within the housing 16, and independently operated, preferably by means of a handle, such as 33, but readily adapted to operation through links and levers or by an independently controlled power source.

A cam plate 32 integral with or fixedly secured to pinion 24, embodies one or more cam slots 36 which engage with rollers 34 rotatably mounted upon followers 35, which are fixedly secured to tool slides 20. Obviously, any motion of the cam plate 32 relative to the cutter head 15 will operate through the rollers and followers to impart radial motion to the tool holders, thereby feeding the parting tools 22 into or away from the work.

When the cutter head is held in a fixed position, there is no possibility of relative movement between pinion 23, planet gears 25, and internal gears 29. Consequently, when rotary motion is imparted to internal gears 30 through handle 33, planet gear 26 is caused to rotate about the shaft 27, and in doing so causes pinion 24 and cam plate 32 to rotate in a direction counter to that of 30. As explained in the preceding paragraph, this rotation of the cam plate relative to the cutter head causes radial movement of the tool slides and cutters into or away from the work. In broader terms, any movement of internal gear 30 relative to 29 will cause rotation of planet gears 26 relative to 25 (about shaft 27) and also causes movement of pinion 24 relative to 23, thereby advancing or retracting the tools.

This latter statement is true, not only when the cutter head is stationary, but also when it is rotating. In the latter case the planet gears are given a primary rotation about shafts 27, as well as a secondary rotation about the axis of rotation of the cutter head. This secondary rotation is determined by the relative sizes of the gears and by the rotational speed of the cutter head, and is absolutely fixed for any given value of the latter. Nevertheless, any movement of the internal gears 30 will affect the primary rotation of planet gears 26, causing rotation of the latter about shaft 27 relative to planet gears 25, and thereby producing movement of pinion 24, relative to 23. In other words, relative movement between members of each pair of internal gears, planet gears, and pinions will be identical at all speeds of the cutter head, and independent thereof. Radial motion of the cutter blades is therefore dependent solely upon the movement imparted to internal gears 30.

There are many applications of this type of mechanism. Its operation, as applied to the structure disclosed in Figs. 1 and 3 is as follows: With the cutter head rotating at a suitable speed, the operator pulls lever 6 forward, thus moving positive stop 5 into an effective position and operating valve 8 through link 7, thereby releasing chuck 9. Tubing 3, now unclamped, is free to move forward under the compulsion of feed mechanism 2, until the end of the tubing strikes the positive stop. When this position is reached the operator returns lever 6 to its normal position. The first part of this movement permits valve 8 to return to its normal position wherein chuck 9 is caused to grip the tubing tightly; the remainder of this movement returns the positive stop to an ineffective position. The tubing is now in a position to be cut, and the operator pulls handle 33 or operates other means for imparting limited rotation to internal gears 30. The parting tools 22, while rotating about the work, are thus caused to feed radially into the work as previously described, severing a piece of the desired length from the main body of the tubing. When this piece is removed, and the blades retracted, the cycle of operation has been completed.

A somewhat different modification is disclosed in Fig. 4. The chuck, generally designated as 37, is mounted upon the cover 31 of the cut-off mechanism 10. A hollow stem 38 is inserted through the hollow stem 17 leaving ample clearance to permit the free rotation of the latter. The reciprocating piston rod 39 with a central hole large enough to receive the tubing 3', is fitted into the hollow stem 38. The piston rod 39, at a point near the cutter blade, is provided with a tapered end 40, which fits into a removably secured tapered socket 41, and with slots 42 which permits contraction in diameter. Movement of the piston rod in the direction of receding diameter of the tapered end forces said taper against that of the socket 41, and pinches the inner surface of the rod against the tubing, thus clamping said tubing close to the point of cutter action, and substantially eliminating vibration. The tapered end 40 is preferably made as a separate, removably secured element, or a series of such elements to receive different sizes of tubing. The cycle of operation remains unchanged with this type of construction.

Figure 2:
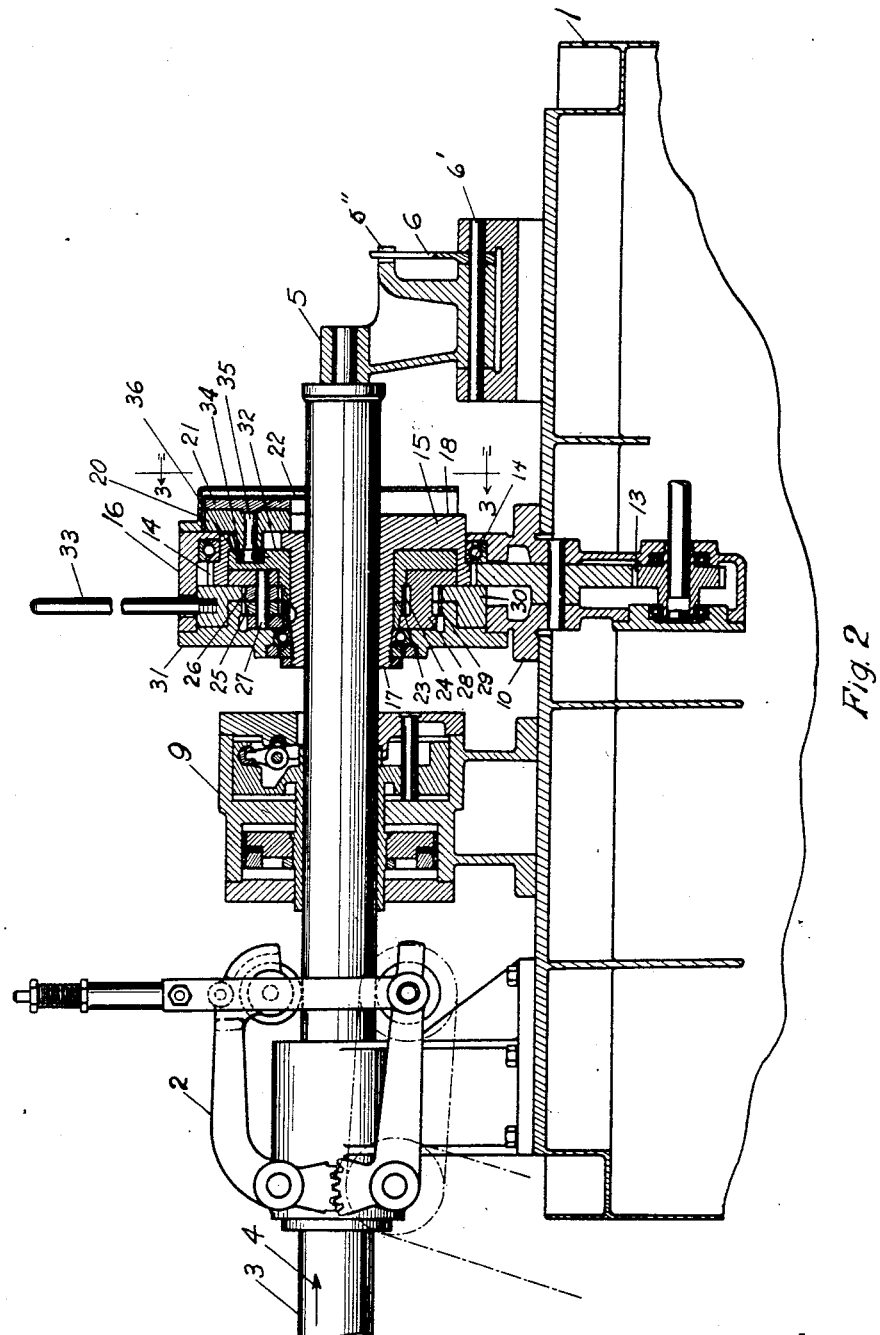
Fig. 2 is a side elevation of the same machine, and shows in particular the cut-off mechanism in section.

It is not deemed necessary to make specific reference to all parts designated by primed numerals in Fig. 4 for the reason that such parts may be identical with those herebefore described and designated by corresponding unprimed numbers in Fig. 2.

From the foregoing description, it will become apparent to those skilled in the art that I have provided a new principle in cut-off machines which is rapid and efficient and can be satisfactorily operated by unskilled labor.

Having thus described my invention, what I claim as new and desire to protect by Letters Patent is:

1. In a rapid cut-off machine, the combination of a work holder, of a fixed cutter head housing, a cutter head through which the work is passed entirely located within said housing, said cutter head having a face portion in which tools are received for movement to and from the work, an external gear carried by said cutter head located adjacent the face thereof, a gear train coacting with said external gear to drive said cutter head, tools supported in said cutter head for rotation therewith as a unit, means driven by said cutter head and rotatable therewith as a unit for operating said tools and means for effecting relative rotation between said cutter head and said first means for operating said tools.

2. In a rapid cut-off machine, the combination of a work holder, of a fixed cutter head housing, of a cutter head through which the work is passed located within said housing and having a face portion in which tools are supported for radial movement to and from the work, an external gear carried by said cutter head and located adjacent said face portion, said head being directly externally supported on antifriction bearings carried by the said housing and located in substantially the same general vertical plane as said face portion and external gear, a gear train coacting with said external gear for driving said cutter head, tools supported in said cutter head for rotation therewith as a unit, means separate from and driven by said cutter head and rotatable therewith as a unit for operating said tools, and means for effecting relative rotation between said cutter head and said first means for operating said tools.

3. In a rapid cut-off machine, the combination with a work holder, of a fixed cutter head housing, a cutter head through which the work is passed located within said housing, said head having a face portion, a gear train coacting with said external gear for driving said cutter head, said head being directly externally supported on antifriction bearings carried by said housing and located in substantially the same general vertical plane as said face portion, tools supported in said cutter head for rotation therewith as a unit, means separate from and driven by said cutter head and rotatable therewith as a unit for operating said tools, and means for effecting relative rotation between said cutter head and said first means for operating said tools.

4. In a rapid cut-off machine, the combination of a work holder, of a compact fixed cutter head housing and cutter head assembly comprising a cutter head through which the work is passed entirely located within said housing and having a face portion for receiving tools to be moved to and from the work, said cutter head having an external gear located adjacent said face portion, a gear train coacting with said external gear for driving said cutter head, tools located in said cutter head and rotatable therewith as a unit, means separate from and driven by said cutter head and rotatable as a unit for operating said tools, and means for operating said first means for effecting relative rotation between said cutter head and said first means for operating said tools.

5. In a rapid cut-off machine, the combination of a work holder, of a compact fixed cutter head housing and cutter head assembly comprising a cutter head through which said work is passed located within said housing, said cutter head having an elongated hub portion through which the work passes, a face portion through which tools are supported for movement to and from the work and an external gear adjacent said face portion, means located about said hub portion and driven thereby and rotated as a unit therewith for operating said tools, and means for effecting relative movement between said cutter head and said first means for operating said tools.

6. In a rapid cut-off machine, a compact fixed cutter head housing, cutter head and work holder assembly comprising a rotatable tool supporting cutter head concentrically journaled and located entirely within said housing, having a hub portion through which the work may pass, a work clamp concentrically located within said hub, said cutter head having a face portion in which the tools are supported and rotated therewith as a unit, means for clamping said work holder upon the work adjacent said face portion, means located about said hub portion and driven thereby and rotated as a unit therewith for operating said tools, and means for effecting relative rotation between said cutter head and said first means for operating said tools.

7. In a rapid cut-off machine, a compact fixed cutter head housing, cutter head and work holder assembly comprising a rotatable tool supporting cutter head concentrically journaled and located entirely within said housing, having a hub portion through which the work may pass, a work clamp concentrically located within said hub, said cutter head having a face portion in which the tools are supported and rotated therewith as a unit, an external gear carried by said head adjacent said face portion, a gear train for driving said head through said external gear, means for clamping said work holder upon the work adjacent said face portion, means located about said hub portion and driven thereby and rotated as a unit therewith for operating said tools, and means for effecting relative rotation between said cutter head and said first means for operating said tools.

8. In a rapid cut-off machine, a compact fixed cutter head housing, cutter head and work holder assembly comprising a rotatable tool supporting cutter head concentrically journaled and located entirely within said housing, having a hub portion through which the work may pass, a work clamp concentrically located within said hub, said cutter head having a face portion in which the tools are supported and rotated therewith as a unit, an external gear carried by said head adjacent said face portion, a driven gear meshing with said external gear at the bottom for driving said head through said external gear, means for clamping said work holder upon the work adjacent said face portion, means located about said hub portion and driven thereby and rotated as a unit therewith for operating said tools, and means for effecting relative rotation between said cutter head and said first means for operating said tools.

9. In a rapid cut-off machine, the combination with a fixed cutter head housing, of a rotatable cutter head concentrically located in said housing through which the work may pass, a removable stop, means for feeding the work against said stop, a work holder, operating means therefor, and a lever operably connected to said operating means and said stop, whereby said stop and operating means are actuated in timed relation.

10. In a rapid cut-off machine, the combination with a fixed cutter head housing, of a rotatable cutter head concentrically located in said housing through which the work may pass, a removable stop, means for feeding the work against said stop, a work holder, operating means therefor, and mechanism connected to said stop and said operating means for succcessively clamping said work and removing said stop.

HOWARD D. CORWIN.